US007240988B2

(12) United States Patent
Gardner et al.

(10) Patent No.: US 7,240,988 B2
(45) Date of Patent: Jul. 10, 2007

(54) MULTI-PASS COLOR PRINT MODE METHODS AND APPARATUSES

(75) Inventors: John Gardner, San Diego, CA (US); Stephen W. Bauer, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1270 days.

(21) Appl. No.: 10/042,823

(22) Filed: Nov. 13, 2001

(65) Prior Publication Data
US 2003/0090685 A1    May 15, 2003

(51) Int. Cl.
B41J 2/145    (2006.01)
(52) U.S. Cl. .......................................... 347/43; 347/15
(58) Field of Classification Search ................ 347/100, 347/43, 15
See application file for complete search history.

(56) References Cited

U.S. PATENT DOCUMENTS

| | | | | |
|---|---|---|---|---|
| 5,488,398 A | * | 1/1996 | Matsubara et al. | 347/43 |
| 5,500,661 A | * | 3/1996 | Matsubara et al. | 347/41 |
| 5,734,405 A | * | 3/1998 | Suzuki | 347/105 |
| 6,234,606 B1 | * | 5/2001 | Suzuki | 347/43 |
| 6,322,187 B1 | * | 11/2001 | Wyble | 347/15 |
| 6,540,329 B1 | * | 4/2003 | Kaneko et al. | 347/43 |
| 2002/0122106 A1 | * | 9/2002 | Ylitalo | 347/102 |

OTHER PUBLICATIONS

U.S. Appl. No. 60/259582.

* cited by examiner

*Primary Examiner*—Manish S. Shah
*Assistant Examiner*—Laura E. Martin

(57) ABSTRACT

Methods and apparatuses are provided for use in multi-pass printing, which, through the selective ordering of the application of inks to a print media, promote increased dot gain when desired and decreased dot gain when desired. For example, an adaptable print mode method is provided to select between a dark dot gain print mode and an object definition print mode. The dark dot gain print mode causes at least one dark color ink to be selectively applied to a dry portion of a print media. Thereafter, at least one light color ink is selectively applied to the portion of the print media while it is still wet from the application of the dark color ink(s). Conversely, the object definition print mode is configured to cause at least one light color ink to be selectively applied to a dry portion of the print media, and thereafter at least one dark color ink is selectively applied to the portion of the print media while it is still wet from the application of the light color ink(s).

39 Claims, 5 Drawing Sheets

(A)

(B)

(C)

| LEVEL | DARK INK APPLICATION | LIGHT INK APPLICATION |
|---|---|---|
| THREE | [(0,2,4)(0,2,4)<br>(1,3,5)(1,3,5)<br>(0,2,4)(0,2,4)<br>(1,3,5)(1,3,5)] | [(2,4,6)(2,4,6)<br>(3,5,7)(3,5,7)<br>(2,4,6)(2,4,6)<br>(3,5,7)(3,5,7)] |
| TWO | [(0,2)(0,2)<br>(1,3)(1,3)<br>(0,2)(0,2)<br>(1,3)(1,3)] | [(4,6)(4,6)<br>(5,7)(5,7)<br>(4,6)(4,6)<br>(5,7)(5,7)] |
| ONE | [(0)(2)<br>(1)(3)<br>(0)(2)<br>(1)(3)] | [(6)(4)<br>(7)(5)<br>(6)(4)<br>(7)(5)] |

400

MULTI-PASS COLOR PRINT MODE METHODS AND APPARATUSES

TECHNICAL FIELD

The present invention relates generally to color printing, and more particularly to color print mode methods and apparatuses for use in multi-pass color printing devices.

BACKGROUND

Color printing devices, such as, for example, ink-jet printers operate by applying small drops of ink to a print media (e.g., paper), thereby forming dots. Different colored dots are combined to form various desired colors for pixels that are being printed. By way of example, certain ink-jet printers utilize six different colors of ink, namely, dark Cyan (C), light cyan (c), dark Magenta (M), light magenta (m), yellow (Y), and black (K). Some ink-jet printers use fewer color inks, e.g., just four C, M, Y and K ink, while still others may use more than six color inks.

The inks are typically supplied by ink pens having several nozzles, which can be selectively controlled to eject drops of ink onto the print media. The ink pens are typically arranged in a print pen carriage that is moveably controlled by a transport mechanism such that a swath of color can be applied to a portion of the print media by selectively controlling the ink pens moving in relation to the print media.

Certain printing devices are configured to print bi-directionally. This means, for example, that swaths may be printed as the carriage of pens moves across the print media from a right hand side to a left hand side and then back across the paper from the left hand side to the right hand side. This bi-directional movement is then continued on down the print media, as needed to print the desired content.

Some bi-directional printing devices are configured to perform multi-pass printing, wherein several overlapping swaths are applied to an area of the print media in a sequential and selective manner. As such, a combination of inks in the form of layered dots may be employed to render colors in the resulting print.

One common use for such multi-pass printing processes is in the printing of photographic-like quality images. By way of example, certain conventional ink-jet printers can be configured to perform up to eight or more passes over an area of the print media during which a plurality of dots may be formed to represent each pixel in content being printed. To increase the visual quality of the resulting print, especially when the content includes images and graphics, special photographic quality inks and/or special photographic print media may be used.

Improvements have been made over the past few years in the inks and print media that are available today. Many of these improvements have been directed towards either improving or conversely compromising the dot gain of all of the color inks in an ink set. The dot gain (e.g., how much an ink drop grows compared to the initially wetted area) can be either improved or compromised by either changing the properties of the inks and/or the properties of the print media. One might seek to improve or increase the dot gain to support the printing of images, wherein more diffused dots tend to provide for a more photographic-like image quality. Conversely, one might seek to compromise or reduce the dot gain to improve the visibility and/or definition of an edge or object definition, for example, as might be advantageous in printing text and other lines.

Consequently, printing devices, processes, inks and/or media have tended to focus on only one of these printing goals. This is not always accomplished without some complication being introduced. One particular complication can be seen in the use of more aggressive, high dot gain inks (e.g., inks having highly penetrating solvents and surfactants), which may damage parts of the printing device and/or make the printer more difficult to service as the ink almost inevitably comes in contact with other materials in the printing device.

For these and other reasons, it would be beneficial to have methods and apparatuses that support both of these above-mentioned seemingly juxtaposed printing goals without necessarily requiring more improvements to either the inks and/or print media.

SUMMARY

In accordance with certain aspects of the present invention, methods and apparatuses are provided for use in multi-pass printing, which, through the selective ordering of the application of inks to a print media, promote increased dot gain when desired and decreased dot gain when desired.

Thus, for example, the methods and apparatuses may selectively increase the dot gain of certain color inks to support the printing of images, wherein the resulting diffused dots tend to provide for a more photographic-like image quality. The same methods and apparatuses may, for example, also selectively reduce the dot gain of certain color inks to improve the visibility and/or definition of an edge or general object definition, for example, as might be advantageous in printing text, graphics and other lines.

In accordance with certain exemplary implementations of the present invention, an adaptable print mode method is provided for use in a color printer. The adaptable print mode method includes selecting between at least two print modes. The print modes include a dark dot gain print mode and an object definition print mode. The dark dot gain print mode is configured to cause at least one dark color ink to be selectively applied to a dry portion of a print media. Thereafter, at least one light color ink is selectively applied to the portion of the print media while it is still wet from the application of the dark color ink(s). Conversely, the object definition print mode is configured to cause at least one light color ink to be selectively applied to the dry portion of the print media, and thereafter at least one dark color ink is selectively applied to the portion of the print media while it is still wet from the application of the light color ink(s).

In certain implementations, the selection of the print mode may be based on the type of content to be printed on the print media, at least one parameter associated with the ink(s), and/or at least one parameter associated with the print media. In certain cases, the dark color ink(s) has more colorant (i.e., dyes, pigments, toners, etc.) than the light color ink(s). The dark color ink(s) may include, for example, Black (K) ink, dark Magenta (M) ink, dark Cyan (C) ink, or other like inks. The light color ink(s) may include, for example, Yellow (Y) ink, light magenta (m) ink, light cyan (c) ink, or other like inks.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
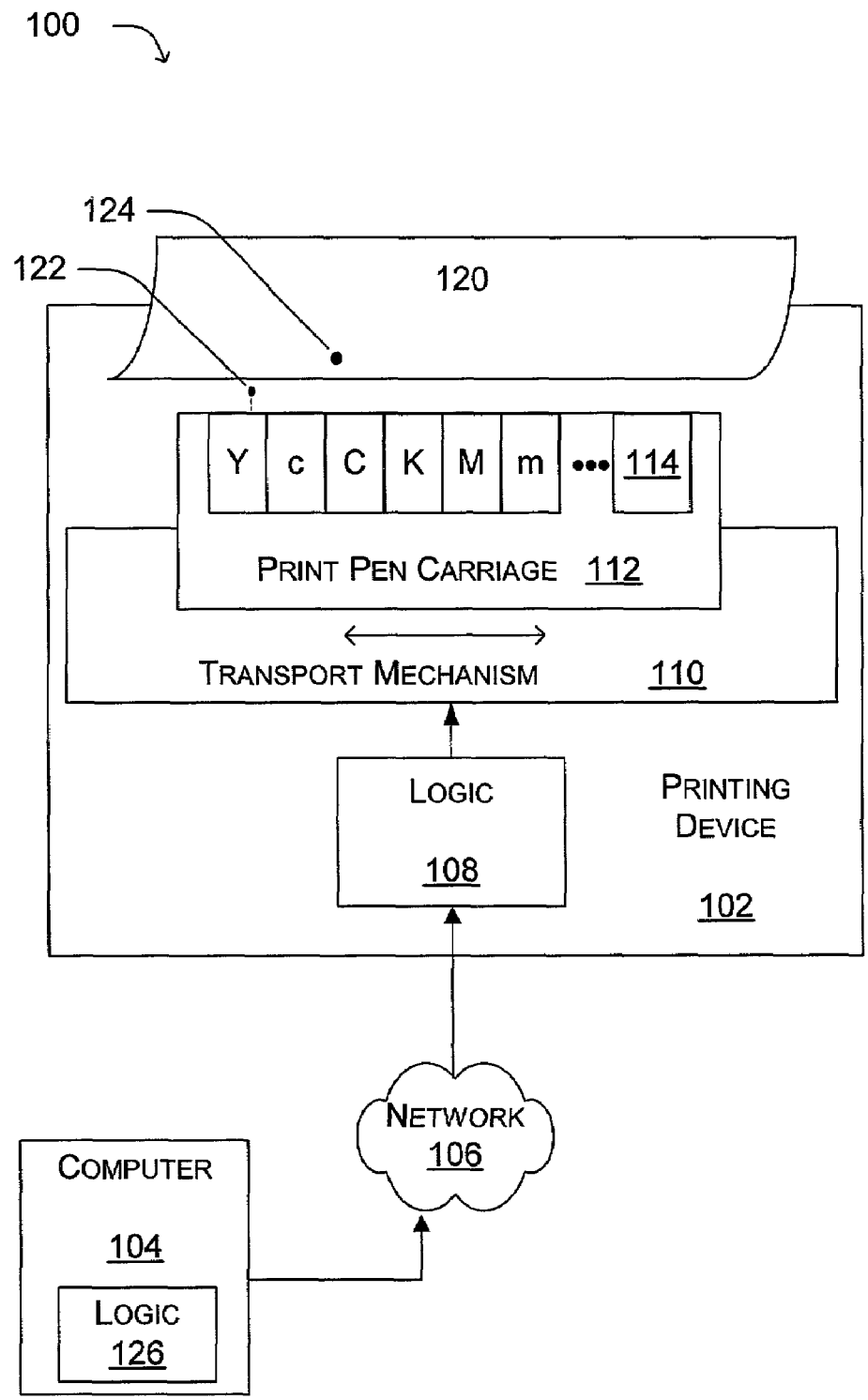
FIG. 1 is a block diagram depicting a printing environment having a multi-pass color printing device, in accordance with certain exemplary implementations of the present invention.

FIG. 1 depicts an exemplary printing environment 100 that includes a multi-pass printing device 102. Printing device 102 is representative of any device that is configured to selectively apply at least two different colors of a marking substance (e.g., ink, dye, toner, etc.) to a print media 122 via at least two overlapping passes. By way of example, printing device 102 may include a printer, a copier, a facsimile machine, or other like device.

As described in the exemplary implementations below, printing device 102 takes the form of an ink-jet printer, which is operatively coupled to a computer 104 through a network 106. Computer 104 is representative of any device capable of providing print and/or control data to printing device 102. Here, computer 104 includes (optional) logic 126 that is described in greater detail in subsequent sections.

Network 106 is representative of any communication resource and/or link capable of carrying print and/or control data from computer 104 to printing device 102. Thus, by way of example, network 106 can represent a wired connection and/or a wireless connection.

Printing device 102 includes logic 108 that is configured to control the multi-pass printing process. Logic 108 may include hardware, firmware, and/or software. Logic 108, in this example, is configured to receive print data from computer 104 via network 106. Logic 108 then orchestrates the corresponding multi-pass printing process.

For example, logic 108 directs a transport mechanism 110, which is configured to selectively move a print pen carriage 112 with respect to print media 122. Print media 122 is also configured to be selectively moved with respect to print pen carriage 112, for example, by a print media transport mechanism (not shown).

Print pen carriage 112 includes at least one print pen 114. In this implementation, for example, a plurality of print pens is included in print pen carriage 112. Here, each print pen 114 provides a color ink, e.g., Y, c, C, K, m, and M inks. This is a representative set of inks. In other implementations, there may be any number of inks. In still other implementations, a single print pen may be configured to provide a plurality of different inks.

Since this exemplary implementation is an ink-jet printer, print pen 114 includes a die providing a plurality of nozzles (not shown). The nozzles may be grouped as an array or other like arrangement. Each nozzle is configured to selectively eject an ink drop 122, which causes a dot 124 on print media 120. During printing, for example, transport mechanism 110 moves print carriage 112 and ink drops 122 are selectively placed on print media 120 to form a color swath (not shown) comprised of a plurality of dots.

In this example, printing device 102 is a bidirectional multi-pass printer, which means that print pen carriage 112 and pens 114 print in two directions of movement and produce a plurality of overlapping color swaths. Here, for example, print pen carriage 112 moves left to right and right to left with respect print media 122, which moves up and/or down with respect to print pen carriage 112.

Figure 2:
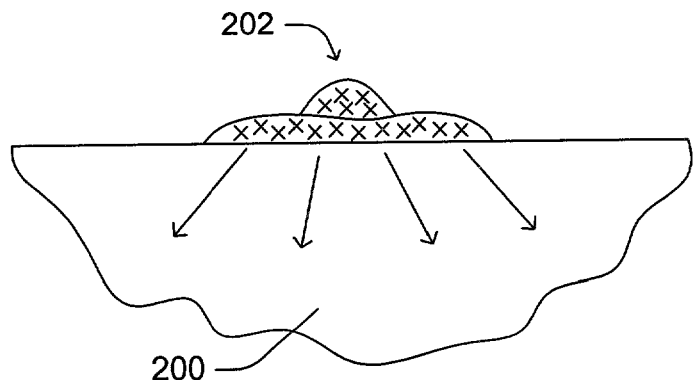
FIGS. 2 (A–C) illustrate certain dot gain properties associated with a multi-pass printing process suitable for use in the printing environment in FIG. 1, for example, in accordance with certain exemplary implementations of the present invention.
Figure 2:
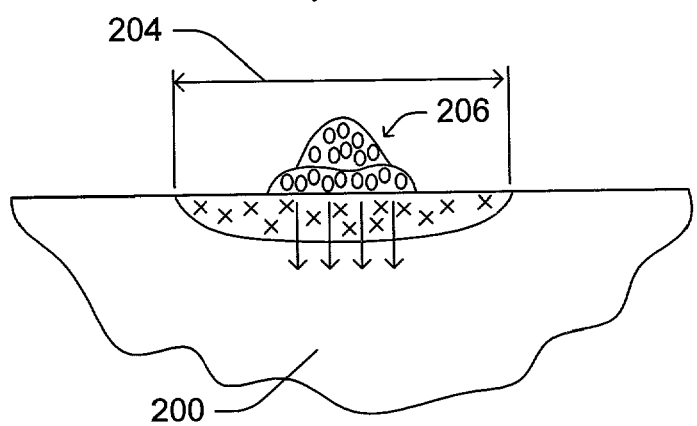
Figure 2:
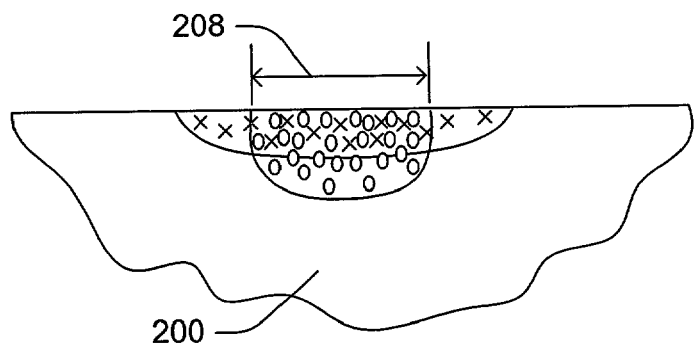

With this in mind, attention is now drawn to FIG. 2A, wherein a portion 200 of a print media is shown as having a liquid ink drop 202 on its previously "dry" surface. As illustrated by the arrows, the properties of ink drop 202 and portion 200 are such that the material in ink drop 202 will penetrate and diffuse (i.e., be at least partially absorbed) by portion 200.

Indeed, this is represented by the similarly marked "x" region in the cross-sectional view of portion 200 in FIG. 2B. Here, the dot gain of ink drop 202 is illustrated by width measurement 204. As can be seen in FIG. 2B, the material of ink drop 202, which was applied to a dry print media in FIG. 2A, has since made its way into portion 200. It is assumed that in FIG. 2B that the ink deposited in ink drop 202 has not yet completely dried. Consequently, for at least a short period of time, the print media that absorbed ink drop 202 is considered to be "wet".

It is on this wet print media that a subsequent ink drop 206 has been applied. Subsequent ink drop 206 may have been applied during the same pass, but with a different pen 114, as ink drop 202, or during a later pass. Here, it is assumed that subsequent ink drop 206 is a different color ink from ink drop 202 and as such it is represented by "0" markings in FIG. 2B. It is further assumed that subsequent ink drop 206 was applied to the same area, as was ink drop 202. Further, although not always necessary, it is assumed that both subsequent ink drop 206 and ink drop 202 contained about the same amount of liquid. Notice, however, that subsequent ink drop 206 does not spread out as much as ink drop 202, but instead is being absorbed more narrowly as illustrated by the arrows pointing into portion 200.

This demonstrates that an ink drop placed on certain types of dry print media tends to spread further (i.e., have a higher dot gain) than the same sized drop placed on a previously wetted print media, for example following the placement of one or more inks thereon. This observation will become more important in subsequent sections.

To continue the example in FIG. 2B, the resulting smaller dot gain associated with subsequent ink drop 206 is illustrated in FIG. 2C, which is the cross-sectional view of portion 200 at a later time. Here, one can see that the order in which the ink drops are applied in a multi-pass printing device can affect the resulting dot gain. For example, subsequent ink drop 206 has a resulting dot gain represented by width measurement 208, which is smaller than the resulting width measurement 204 for ink drop 202 as shown in FIG. 2B.

In one exemplary experiment, three different types of dark Cyan (C) ink drops were applied to both dry and wet photographic quality paper print media to evaluate the resulting width measurements. In a first ink sample, the dry media allowed initial drops of ink to spread out to an average diameter of about 78 microns and subsequent drops of ink to spread out to an average diameter of only about 43 microns. In a second ink sample, the dry media allowed initial drops of ink to spread out to an average diameter of about 79 microns and subsequent drops of ink to spread out to an average diameter of only about 52 microns. Similarly, in the third ink sample, the initial drops of ink produced a dot having an average diameter of about 102 microns and subsequent drops of ink produced a dot having an average diameter of about 58 microns.

It is noted, as more dots are applied for a given pixel, that the print media will likely become wetter and possibly approach saturation. Thus, each subsequent ink drop may produce increasingly smaller diameter dots.

Thus, in accordance with certain aspects of the present invention, methods and apparatuses are provided that selectively control the ordering of inks during overlapped/multipass printing to either promote increases in dot gain when appropriate and/or reduce dot gain when appropriate. For example, the methods and apparatuses can selectively increase the dot gain of certain color inks to support the printing of images, and/or selectively reduce the dot gain of certain color inks to improve the visibility and/or definition of an edge or general object definition.

For photographic-like image quality, it is usually preferable to have little, if any, noticeable graininess in the resulting image. Here, unlike normal photography, the noticeable graininess is not due to the chemistry associated with either the film or the developing paper. Instead, assuming that the initial digital image is detailed enough, any visually noticeable graininess will most likely be due to the dot gain of the ink drops, and in particular the more easily perceived darker ink dots. By increasing dot gain the visibility of the dot is usually decreased. Therefore, by selectively ordering the application of the ink drops one can cause the darker more easily seen dots to have a higher dot gain. For example, darker color ink drops can be applied earlier in the printing process when the resulting dot growth will be largest and associated dot edge sharpness minimized. Later in the printing process, lighter color ink drops can be applied. This type of selective color ink ordering process is provided, for example, in certain implementations as a newly defined print mode that can be provided within logic 108 and/or logic 126 in FIG. 1. This "dark dot gain print mode" is described in greater detail in later sections.

In accordance with another aspect of the present invention, essentially an opposite or reverse selective color ink ordering process can be implemented to support a more constrained dot gain. Here, for example, there may be areas wherein it is preferred that the darker colored inks are more visible and have a sharper edge. This can be achieved by printing the darker dots on wet print media. Hence, lighter color inks can be applied earlier in the printing process to essentially pre-wet the print media. The darker color inks would then be applied later in the printing process. In accordance with certain implementations, this idea is presented in yet another new print mode, namely an "object definition print mode". Again, this print mode can be provided within logic 108 and/or logic 126 in FIG. 1.

In certain exemplary implementations of the present invention, the terms "darker color ink" are meant to refer to inks with more colorant, such as, for example, K, C, and M inks. Likewise, the terms "lighter color ink" are meant to refer to inks with less colorant, such as, for example, c, m, and Y inks. In such exemplary implementations, the print media is assumed to present a lighter color opaque or non-opaque printing surface. It is recognized, however, that for other ink sets and/or print media the meanings of these terms may be different. Moreover, some inks and or print media may have the converse relationship of the dot gain described herein. Nevertheless, those skilled in the art will recognize that the techniques provided herein may be adapted to provide similarly meaningful benefits in such printing environments.

Figure 3:
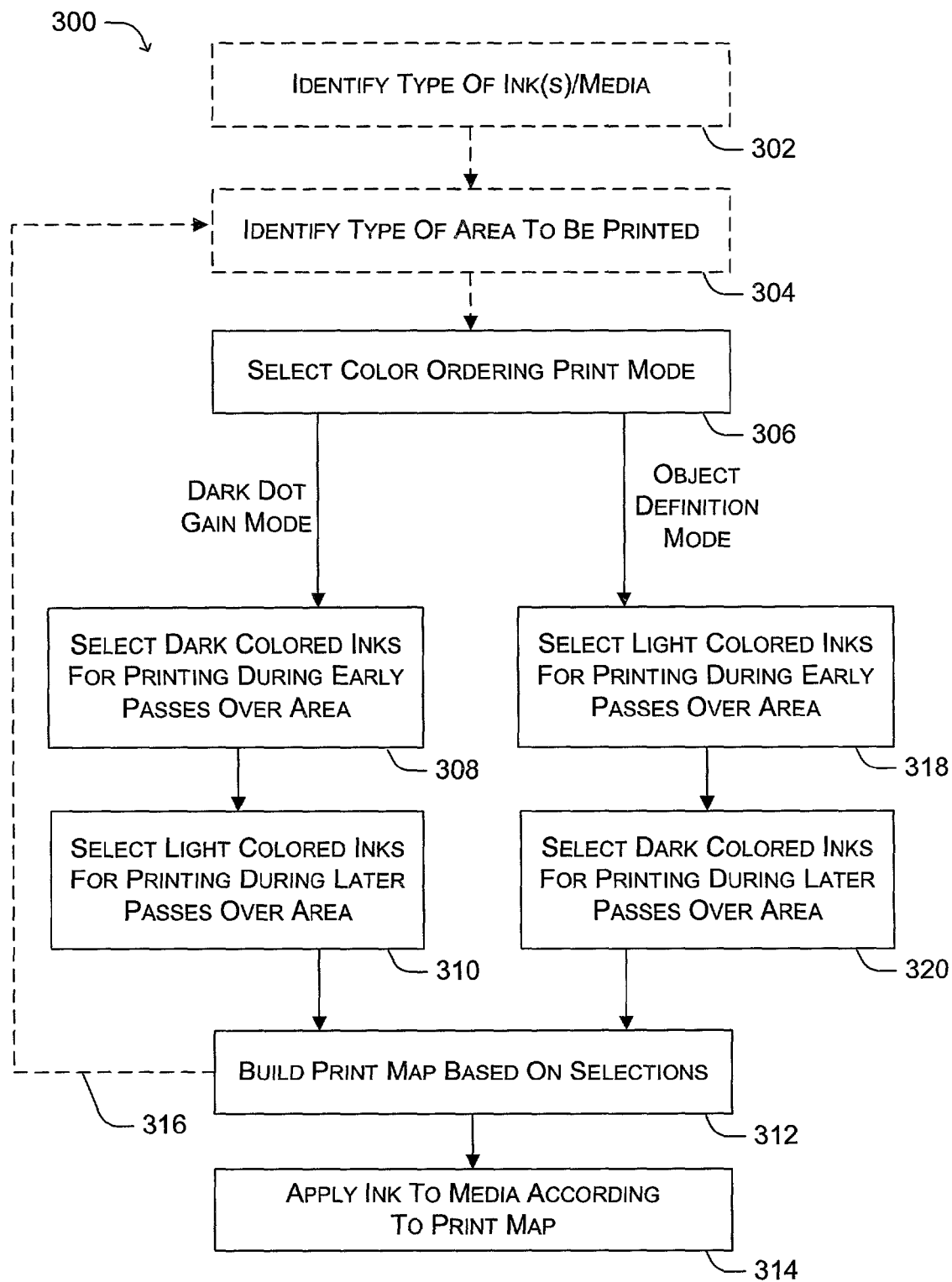
FIG. 3 is a flow diagram depicting a multi-pass printing process suitable for use in the printing environment in FIG. 1, for example, having two selective color ink ordering print modes, in accordance with certain exemplary implementations of the present invention.

Reference is now made to FIG. 3, which depicts an exemplary printing process 300 suitable for implementation in printing device 102, logic 108 and/or logic 126 (see FIG. 1). In step 302, which is optional, the type of inks/ink set and/or print media is identified such that later decisions can be more informed about the proper ordering of ink drops on the print media. This may include, for example: an automated identification information retrieval process, e.g., through one or more sensors and/or inputs within printing device 102 and/or computer 104; a user defined input mechanism, such as, e.g., an input panel or a graphical user interface (GUI) through which the user identifies to an application, print driver, an/or other like program the type of inks being used and/or media being printed to; or, other conventional techniques.

In step 304, which is also optional in certain implementations, the type of data/area to be printed is identified or otherwise determined. Here, for example, the type of data/area to be printed may include text, graphics, images, and/or various other identifiable/recognizable objects. In certain further implementations, the type of data/area identified in step 304 may be based on a swath width; thus, a portion of text, graphics, images, and/or various other identifiable/recognizable objects may be identified. In still further implementations, step 304 may identify text, graphics, images, and/or various other identifiable/recognizable objects on an even smaller level, all the way down to a pixel by pixel determination in some cases.

The information from step 304 can be used in later steps in determining which type of print mode to implement and how best it might be implemented given the data/area to be printed.

In step 306, a color ordering print mode is selected, for example, based on information such as that identified, for example, in steps 302 and 304. In this exemplary implementation only the two new print modes are shown. It is recognized, however, that other print modes may be provided for selection in step 306. Here, a dark dot gain print mode and an object definition print mode are provided, for example, as described above.

Assuming that the dark dot gain print mode is selected in step 306, printing process 300 would then include steps 308 and 310. In step 308, at least one ink with more colorant would be selected, as applicable for printing during one or more early passes over the area being printed (e.g., a swatch). In step 310, at least one ink with less colorant would be selected, as applicable for printing during one or more later passes over the same area being printed.

Next, in step 312, a print map (or like data) is built or otherwise provided based on the selections in steps 306, 308 and 310. The print map essentially defines the ordering in which ink drops are to be applied during each pass and for each pixel. As this point in print process 300, the resulting print map can be used in step 314 to selectively apply the ink(s) to the print media accordingly.

In certain further implementations, in step 312, only a portion of the print map may have been completed. For example, if more information is known about the print data per step 304, then process 300 may include an iterative scheme that allows steps 306, 308 and 310 to be revisited for other portions of the print data. Thus, for example, different identified text, graphics, images, objects or portions thereof, may be associated with different print modes (such as, e.g., an object definition print mode), or at least have a different ink ordering in the dark dot gain print mode. In certain implementations, this or a similar type of iterative scheme may be implemented on a pixel be pixel basis.

Returning now to step 306, if an object definition print mode is selected, then printing process 300 includes steps 318 and 320. In step 318, at least one ink with less colorant would be selected, as applicable for printing during one or more early passes over the area being printed (e.g., a swatch). In step 320, at least one low dye ink would be selected, as applicable, for printing during one or more later passes over the same area being printed.

Next, in step 312, a print map (or like data) is built or otherwise provided based on the selections in steps 306, 318 and 320. Again, the print map essentially defines the ordering in which ink drops are to be applied during each pass and for each pixel. As this point in print process 300, the resulting print map can be used in step 314 to selectively apply the ink(s) to the print media accordingly. Also, as before, an iterative scheme can be introduced as illustrated by the dashed line going back to step 304, for example.

The selection of the ordering of inks in steps 308, 310, 318, and/or 320 may be influenced by information gathered in steps 302 and/or 304. Such ordering selections may also (or otherwise) be based on data and/or algorithms associated with predefined suggested/optimal settings, for example, as determined through experimentation with various inks, ink sets, and/or print media. Such decision logic/data may, for example, be embedded or otherwise supplied to the operative logic (108 and/or 126) by the manufacturer of printing device, application and/or device driver software. In still other implementations the ordering of color inks provided in steps 308, 310, 318, and/or 320 may be simpler in that a predefined order is always applied regardless of the current inks, ink set, and or print media.

Figures 4, 5:
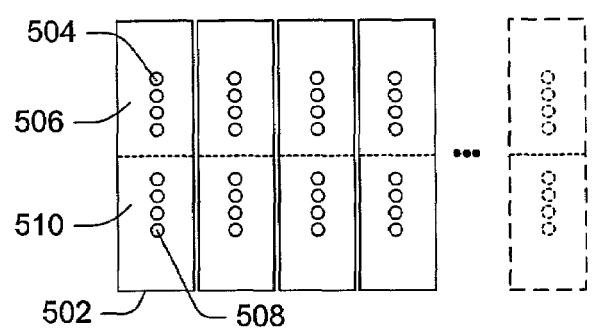
FIG. 4 is an illustrative representation of a print map defining print data associated with the two selective color ink ordering print modes as in FIG. 3, for example, in accordance with certain exemplary implementations of the present invention.
FIG. 5 is an illustrative representation of a pen set that is electrically staggered, in accordance with certain exemplary implementations of the present invention.

Reference is now made to FIG. 4, which illustratively depicts a print map 400 showing various exemplary print data associated with a dark dot gain print mode. In this example, the source file is assumed to be an image that is to be printed at 1200 dots per inch (dpi) resolution. The source file includes 2-bits of data per pixel, which means that each pixel can be printed using either 0, 1, 2, or 3 drops of ink. Multi-pass printing device 102, in this example, is configured to make eight passes. As such there are eight chances to apply the 0 to 3 drops of ink per pixel.

In print map 400, pass identification information for eight different pixels is presented as represented between square brackets "[ . . . ]". Within the square brackets, each pixel is represented by parenthesis "( . . . )". The numbers inside the parenthesis identify numbered passes 0–7. Thus, for example, "[ . . . (0,2) . . . ]" in print map 400 identifies that one of the eight pixels will have a drop of ink applied during an initial pass 0 and again during a subsequent pass 2.

Print map 400 is further illustratively divided into three labeled columns and three rows. The first column simply identifies different levels (one, two and three) corresponding to the number of dark or light ink drops to be applied per pixel. The second column depicts pass information associated with the application of dark ink for each level. The third column depicts pass information associated with the application of light ink for each level.

With this in mind, print map 400 illustrates, for example, that for level two, dark ink will be applied for the eight exemplary pixels as follows "[(0,2)(0,2)(1,3)(1,3)(0,2)(0,2)(1,3)(1,3)]" and light ink will be applied for the same eight exemplary pixels as follows "[(4,6)(4,6)(5,7)(5,7)(4,6)(4,6)(5,7)(5,7)]". Thus, considering just the first listed pixel, the ordering for ink application will be to apply a dark ink(s) during the initial pass 0 and again during a subsequent pass 2, and then apply a light ink(s) during later passes 4 and 6.

There may be times when a dark ink and a light ink are applied to the same pixel during the same pass. This is illustrated by the first listed pixel for level three. Here, dark ink is applied during passes 0, 2 and 4, and light ink is applied during passes 2, 4 and 6. Thus, as further described below there may be some cross-over of dark and light ink application in the dark dot gain print mode.

In some levels the separation of dark color inks and light color inks is exclusive. For example, as shown in FIG. 4, level one causes the dark color inks to be applied during the first four passes, i.e., passes 0, 1, 2, and 3 and light color inks to be applied during the last four passes, i.e., passes 4, 5, 6, and 7. This exclusive separation of dark color and light color inks is also provided in level two, wherein once again, the dark color inks are applied during the first four passes, i.e., passes 0, 1, 2, and 3 and the light color inks are applied during the last four passes, i.e., passes 4, 5, 6, and 7.

To the contrary, in level three there is some cross-over between dark color and light color application. For example, the dark color inks are applied during the first five passes, i.e., passes 0, 1, 2, 3, and 4 and the light color inks are applied during all passes except the first two passes, i.e., passes 0 and 1. Thus, both dark color and light color inks are applied during passes 2, 3, and 4.

A similar type of illustrative print map can be developed for the object definition print mode. For example only, if the second and third column data is swapped, then the light ink would be applied in early passes and the dark ink applied in later passes.

To print a secondary color, for example, one or more inks are applied to the same area. For example, magenta ink and yellow ink can be applied, one on top of the other, to create a red area. The methods and apparatuses are particularly useful when printing such multiple ink areas, wherein dot gain may be an important issue. For example, dot gain may be important when yellow ink and black ink are to be applied. The ordering of these inks will control the amount of dot gain (e.g., for the dark color ink) that results.

The methods and apparatuses are also useful for applying any color ink under a dark color ink, such as, e.g., black ink, when dot gain control is important. For example, dot gain can be controlled by applying cyan ink under black ink.

The methods and apparatuses are useful for use in multi-dye load arrangements, such as, e.g., printing devices having light cyan and dark cyan inks, light magenta and light magenta inks, etc. Here, the ordering and/or ratios of light color and dark color inks can be controlled to provide the desired dot gain and resulting color.

The methods and apparatuses can also include and benefit from the use of a clear or substantially clear ink (e.g., containing only a vehicle), which can be considered a "light" color ink and therefore applied in a manner to control dot gain of subsequently applied inks (both light color and dark color inks).

The above examples described different print modes that control the order in which inks are applied. The methods and apparatuses provided herein are thus applicable to printing devices that scan across the print media using selectively electrically staggered pens and/or physically staggered pens. The methods and apparatuses provided herein are further applicable to printing devices that have a non-scanning array of pens, e.g., an array of pens that is as wide as the print media.

With regard to scanning type printing devices, an exemplary pen set 500 is shown in FIG. 5. Here, at least one of the pens 502 includes one or more nozzles 504 that are selectively operatively configured in a top portion 506 and one or more nozzles 508 that are selectively configured in a bottom portion 510 by a print mode. In this manner, for example, pen set 500 is essentially electrically staggered such that certain color inks will be applied before other color inks as pen set 500 scan across the print media. In certain implementations, such electrical staggering by a print mode may occur on-the-fly during printing.

Figure 6:
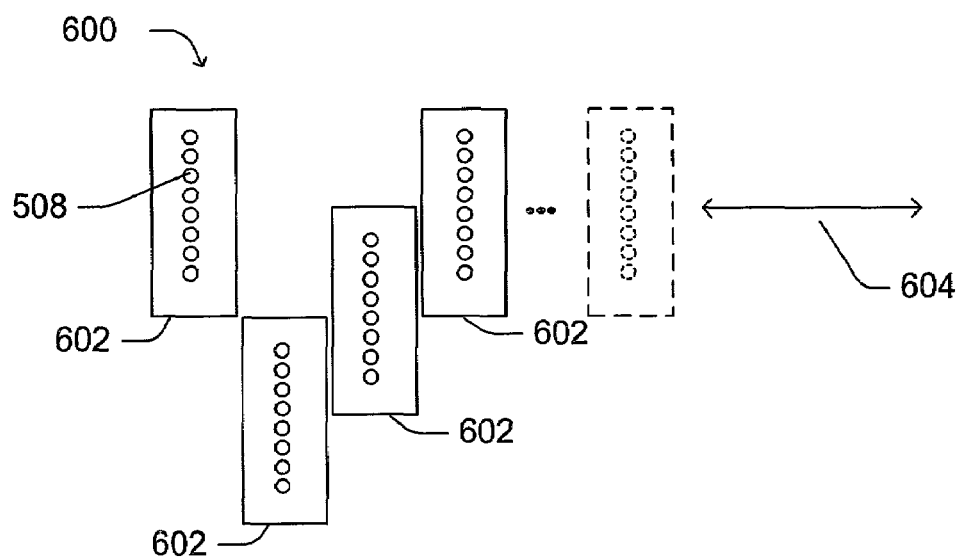
FIG. 6 is an illustrative representation of a pen set that is physically staggered, in accordance with certain exemplary implementations of the present invention.

FIG. 6 depicts an exemplary physically staggered pen set 600 having a plurality of pens 602 that are physically arranged such that certain color inks will be applied before other color inks as pen set 600 scans across the print media. As illustrated not all of the pens are aligned along horizontal axis 604. In this manner, a printing device can be physically configured to support particular print modes in accordance with the various implementations described above, for example.

Figure 7:
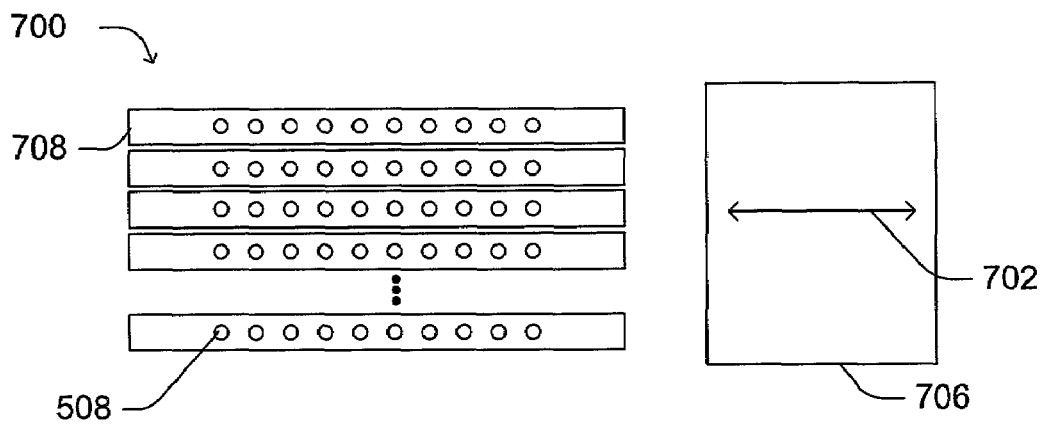
FIG. 7 is an illustrative representation of a non-scanning pen set, in accordance with certain exemplary implementations of the present invention.

FIG. 7 illustratively depicts a non-scanning array of pens 700 that essentially covers the width 702 of a desired printable area 704 of a print media 706. Non-scanning array of pens 700 includes a plurality of pens 708 are physically arranged in a certain order such that certain color inks will be applied before other color inks as the print media is moving past (and possibly back and fourth) the array of pens 700. This is analogous to the passes described above, only here the passes are caused by the moving print media rather that the scanning of the pens. Here, there may be one or more passes. Note, that in certain implementations, array of pens 700 may include more than one pen of a given color. For example, array of pens 700 may include two separate black ink, yellow ink, etc., such that the ordering of dark color and light color inks to control dot gain, per the above examples, can be conducted.

Thus, although some preferred embodiments of the various methods and apparatuses of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method of printing according to a selectable print mode comprising:
    selecting between a dark dot gain print mode and an object definition print mode, wherein the print modes produce different output, such that the dark dot gain print mode enhances photographic image quality and the object definition print mode enhances object edge definition;
    wherein printing in the dark dot gain print mode comprises:
        applying at least one dark color ink to a dry portion of a print media; and
        applying at least one light color ink to said portion of said print media that is still wet following said application of said at least one dark color ink; and
    wherein printing in the object definition print mode comprises:
        applying at least one light color ink to a dry portion of the print media; and
        applying at least one dark color ink to said portion of said print media that is still wet from the application of said at least one light color ink.

2. The method as recited in claim 1, wherein said at least one dark color ink has more colorant than said at least one light color ink.

3. The method as recited in claim 1, wherein:
    said at least one dark color ink is selected from a group of color inks comprising Black (K) ink, dark Magenta (M) ink, and dark Cyan (C) ink; and
    said at least one light color ink is selected from a group of color inks comprising Yellow (Y) ink, light magenta (m) ink, and light cyan (c) ink.

4. The method as recited in claim 1, wherein:
    selecting between said at least two print modes is based on content to be printed on said print media.

5. The method as recited in claim 1, wherein:
    selecting between said the print modes is based in part on a parameter associated with the inks.

6. The method as recited in claim 1, wherein:
    selecting between the print modes is based in part on a parameter associated with the print media.

7. An adaptable print mode method for use in a color ink jet printer, the adaptable print mode method comprising:
    selecting between at least two print modes comprising a dark dot gain print mode and an object definition print mode, wherein the print modes produce different output, such that the dark dot gain print mode enhances photographic image quality and the object definition print mode enhances object edge definition, and wherein:
    said dark dot gain print mode is configured to cause at least one dark color ink to be selectively applied to a dry portion of a print media, and thereafter at least one light color ink to be selectively applied to said portion of said print media while still wet from said application of said at least one dark color ink, and
    said object definition print mode is configured to cause said at least one light color ink to be selectively applied to said dry portion of said print media, and thereafter said at least one dark color ink to be selectively applied to said portion of said print media while still wet from said application of said at least one light color ink.

8. The adaptable print mode method as recited in claim 7, wherein selecting between said at least two print modes is based on content to be printed on said print media.

9. The adaptable print mode method as recited in claim 7, wherein selecting between said at least two print modes is based on at least one parameter associated with said inks.

10. The adaptable print mode method as recited in claim 7, wherein selecting between said at least two print modes is based on at least one parameter associated with said print media.

11. The adaptable print mode method as recited in claim 7, wherein said at least one dark color ink has more colorant than said at least one light color ink.

12. The adaptable print mode method as recited in claim 7, wherein:

said at least one dark color ink is selected from a group of color inks comprising Black (K) ink, dark Magenta (M) ink, and dark Cyan (C) ink; and said at least one light color ink is selected from a group of color inks comprising Yellow (Y) ink, light magenta (m) ink, and light cyan (c) ink.

13. The method as recited in claim 7, wherein an amount of dark color ink is greater than an amount of light color ink.

14. The method as recited in claim 7, wherein an amount of light color ink is greater than an amount of dark color ink.

15. The method as recited in claim 7, wherein selecting between the print modes comprises distinguishing photos and graphics.

16. The method as recited in claim 7, wherein selecting between print modes is based in part on identifying a type of an area to be printed.

17. The method as recited in claim 7, further comprising: building a print map based on a selected print mode.

18. The method as recited in claim 17, further comprising: applying ink according to the print map.

19. The method as recited in claim 7, further comprising: building a print map based on the selecting between the dark dot gain mode and the object definition mode.

20. The method as recited in claim 19, further comprising: sequentially applying ink based on the print map.

21. The method as recited in claim 7, wherein a multi-pass printing process is used.

22. A printing device comprising:

an ink-jet printing mechanism configurable to selectively apply at least two different color inks to a print media; and logic operatively coupled to said ink-jet printing mechanism and configured to select between at least two print modes comprising a dark dot gain print mode and an object definition print mode, wherein the print modes produce different output, such that the dark dot gain print mode enhances photographic image quality and the object definition print mode enhances object edge definition, and wherein:

in said dark dot gain print mode, said logic causes said ink-jet printing mechanism to selectively apply at least one dark color ink to a dry portion of said print media, and only thereafter apply at least one light color ink to said portion of said print media while still wet with said at least one dark color ink, and in said object definition print mode, said logic causes said ink-jet printing mechanism to selectively apply at least one light color ink to said dry portion of said print media, and only thereafter apply at least one dark color ink to said portion of said print media while still wet with said at least one light color ink.

23. The printing device as recited in claim 22, wherein said logic selects between said at least two print modes based on content to be printed on said print media.

24. The printing device as recited in claim 22, wherein said logic selects between said at least two print modes based on at least one parameter associated with said inks.

25. The printing device as recited in claim 22, wherein said logic selects between said at least two print modes based on at least one parameter associated with said print media.

26. The printing device as recited in claim 22, wherein said at least one dark color ink has a greater amount of colorant than said at least one light color ink.

27. The printing device as recited in claim 22, wherein:

said at least one dark color ink is selected from a group of color inks comprising Black (K) ink, dark Magenta (M) ink, and dark Cyan (C) ink; and said at least one light color ink is selected from a group of color inks comprising Yellow (Y) ink, light magenta (m) ink, and light cyan (c) ink.

28. The apparatus as recited in claim 22, wherein said logic is further operatively configurable to access source file data defining at least one object to be printed on said print media using different inks.

29. The apparatus as recited in claim 22, wherein the dark color ink has less colorant than the light color ink.

30. The apparatus as recited in claim 22, wherein the dark color ink has more colorant than the light color ink.

31. The apparatus as recited in claim 22, wherein said print mode defines when, during at least two different printing passes, each ink is to be applied to an applicable portion of said print media.

32. The apparatus as recited in claim 22, wherein said applicable portion is defined to include a photograph.

33. The apparatus as recited in claim 22, wherein said logic is further configurable to operatively identify a type of area to be printed.

34. The apparatus as recited in claim 22, wherein said logic is further configurable to operatively identify types of inks and media.

35. The apparatus as recited in claim 22, wherein said logic is further configurable to establish print map data defining said printing sequence.

36. The apparatus as recited in claim 35, further comprising:

a printing mechanism operatively coupled to said logic and configurable to deliver ink to said print media according to said print map data.

37. The apparatus as recited in claim 36, wherein said printing mechanism applies ink based on said print map data.

38. The apparatus as recited in claim 22, wherein said logic is operatively configurable within a printing device.

39. The apparatus as recited in claim 22, wherein said logic is operatively configurable within a computer device.

* * * * *

UNITED STATES PATENT AND TRADEMARK OFFICE
CERTIFICATE OF CORRECTION

PATENT NO. : 7,240,988 B2 Page 1 of 1
APPLICATION NO. : 10/042823
DATED : July 10, 2007
INVENTOR(S) : John Gardner et al.

It is certified that error appears in the above-identified patent and that said Letters Patent is hereby corrected as shown below:

In column 9, line 57, in Claim 1, after "mode" insert -- , --.

In column 12, line 30, in Claim 32, delete "claim 22" and insert -- claim 31 --, therefor.

Signed and Sealed this

Ninth Day of September, 2008

JON W. DUDAS
*Director of the United States Patent and Trademark Office*